United States Patent
Oh

(10) Patent No.: US 9,900,483 B2
(45) Date of Patent: Feb. 20, 2018

(54) CAMERA MODULE

(71) Applicant: LG Innotek Co., Ltd., Seoul (KR)

(72) Inventor: Youngtaek Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/381,302

(22) Filed: Dec. 16, 2016

(65) Prior Publication Data
US 2017/0099417 A1 Apr. 6, 2017

Related U.S. Application Data

(63) Continuation of application No. 15/075,820, filed on Mar. 21, 2016, now Pat. No. 9,560,255, which is a
(Continued)

(30) Foreign Application Priority Data

Dec. 3, 2010 (KR) ........................ 10-2010-0122909

(51) Int. Cl.
*H04N 5/225* (2006.01)
*G03B 3/10* (2006.01)
(Continued)

(52) U.S. Cl.
CPC ............. *H04N 5/2253* (2013.01); *G02B 7/08* (2013.01); *G03B 3/10* (2013.01); *H02K 41/0356* (2013.01);
(Continued)

(58) Field of Classification Search
CPC .. H04N 5/2253; H04N 5/2257; H04N 5/2254; H04N 5/2259; G02B 7/08; G03B 3/10; G03B 2205/0069; H02K 41/0356
See application file for complete search history.

(56) References Cited

U.S. PATENT DOCUMENTS 7,859,591 B2 12/2010 Tanaka et al.
2005/0225665 A1 10/2005 Chen
(Continued)

FOREIGN PATENT DOCUMENTS

CN 101577790 A 11/2009
CN 101625451 A 1/2010
(Continued)

OTHER PUBLICATIONS

International Search Report in International Application No. PCT/KR2011/008635, filed Nov. 11, 2011.
(Continued)

*Primary Examiner* — Albert Cutler
(74) *Attorney, Agent, or Firm* — Saliwanchik, Lloyd & Eisenschenk

(57) ABSTRACT

The present invention relates to a camera module, the module including: a PCB; an image sensor mounted on the PCB and formed with an image pickup device; a base mounted on the PCB and including a plated portion formed at a lower center with an opening mounted with an IR filter; a lower spring plate formed with a conductive material; a spacer arranged on an upper surface of the lower spring plate and forming a staircase structure by a rib wrapping a periphery of the lower spring plate to supportively apply a pressure to the lower spring plate; a lens actuator including a bobbin, and a yoke; an upper spring plate coupled to an upper surface of the lens actuator; and a cover arranged on an upper surface of the upper spring plate.

20 Claims, 3 Drawing Sheets

Related U.S. Application Data continuation of application No. 13/990,532, filed as application No. PCT/KR2011/008635 on Nov. 11, 2011, now Pat. No. 9,319,573.

(51) Int. Cl.
*H02K 41/035* (2006.01)
*G02B 7/08* (2006.01)

(52) U.S. Cl.
CPC ......... *H04N 5/2254* (2013.01); *H04N 5/2257* (2013.01); *H04N 5/2259* (2013.01); *G03B 2205/0069* (2013.01)

(56) References Cited

U.S. PATENT DOCUMENTS

| | | |
|---|---|---|
| 2007/0086769 A1 | 4/2007 | Watanabe et al. |
| 2008/0143870 A1 | 6/2008 | Tanaka et al. |
| 2008/0192124 A1 | 8/2008 | Nagasaki |
| 2008/0259470 A1 | 10/2008 | Chung |
| 2009/0079863 A1 | 3/2009 | Aoki et al. |
| 2009/0104797 A1 | 4/2009 | Tseng et al. |
| 2009/0278978 A1 | 11/2009 | Suzuki |
| 2010/0007973 A1 | 1/2010 | Sata et al. |
| 2011/0044679 A1 | 2/2011 | Yoshida et al. |

FOREIGN PATENT DOCUMENTS

| | | |
|---|---|---|
| JP | 2009116176 A | 5/2009 |
| KR | 20070001667 A | 1/2007 |
| KR | 20080044976 A | 5/2008 |
| KR | 20090026515 A | 3/2009 |
| KR | 10-2009-0060653 A | 6/2009 |
| KR | 10-2009-0117613 A | 11/2009 |

OTHER PUBLICATIONS

Office Action dated May 25, 2012 in Korean Application No. 10-2010-0122909.
Office Action dated Jan. 23, 2015 in Chinese Application No. 2011/80058281.
European Search Report dated Feb. 24, 2016 in European Application No. 11844494.2.
Office Action dated Sep. 18, 2014 in U.S. Appl. No. 13/990,532.
Office Action dated Mar. 3, 2015 in U.S. Appl. No. 13/990,532.

CAMERA MODULE

CROSS-REFERENCE TO RELATED APPLICATIONS

This application is a continuation of U.S. application Ser. No. 15/075,820, filed Mar. 21, 2016; which is a continuation of U.S. application Ser. No. 13/990,532, filed May 30, 2013, now U.S. Pat. No. 9,319,573, issued Apr. 19, 2016; which is the U.S. National Stage Application of International Patent Application No. PCT/KR2011/008635, filed Nov. 11, 2011; which claims priority to Korean Application No. 10-2010-0122909, filed Dec. 3, 2010, the disclosures of each of which are incorporated herein by reference in their entirety.

TECHNICAL FIELD

The teachings in accordance with exemplary embodiments of this invention relate generally to a camera module, and more particularly to a camera module having a structure capable of being miniaturized and light-weighted.

BACKGROUND ART

A camera module is recently applied to various multimedia fields including notebook type personal computers, camera phones, PDAs (Personal Digital Assistants), smart phones and toys, and to image input equipment including monitoring cameras and information terminals.

A PCB (Printed Circuit Board) of a camera module is manufactured being embedded with various electronic elements, and the electronic elements are generally configured with integrated modules on the PCB. The camera module used on the PCB is frequently mounted with an actuator for automatic focus adjustment generally using a VCM (Voice Coil Motor) method.

In order for the camera module mounted with an VCM actuator to be used for a mobile terminal, light-weightiness and slimness required for design must be accomplished. Meantime, although size of a camera module is basically limited by that of a VCM assembly, there is a disadvantage that even if the size is reduced, no part can be omitted as long as function of the VCM assembly has to be maintained.

FIG. 1 is a schematic structural view of a camera module according to prior art. Referring to FIG. 1, the conventional camera module includes a PCB (11) mounted with an image sensor (12), a base (20) on the PCB (11), upper and lower spring plates (30, 60), a spacer (40), a cover (70), a lens assembly (51), a bobbin (52), a lens actuator (50) including a coil (53) and a yoke (54) and a shield can (80).

That is, the cover (70) structurally takes a shape of an enclosure formed with a bottom-opened inner space, and accommodates the upper/lower spring plates (30, 60) and the lens actuator (500) at the inner space.

DETAILED DISCLOSURE

Technical Problem

The present invention is to provide a camera module directed to solve the aforementioned problems or disadvantages by changing the structure of a cover to correct a coupled relationship between an actuator and a base, whereby a miniaturization of the camera module can be accomplished.

Technical problems to be solved by the present invention are not restricted to the above-mentioned, and any other technical problems not mentioned so far will be clearly appreciated from the following description by skilled in the art.

Technical Solution

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a PCB; an image sensor mounted on the PCB; a base mounted on the PCB and including a lower plate portion with an opening centrally mounted with an IR (infrared) filter, and a lower pillar portion erected at a corner portion of the lower plate portion; a lower spring plate arranged at an upper surface of the lower plate portion of the base and formed with an elastic support portion; a lens actuator including a bobbin elastically supported by the elastic support portion of the lower spring plate and accommodated inside with a lens assembly, and a yoke wrapping a periphery of the bobbin and secured onto the base; an upper spring plate having an elastic support portion coupled to an upper surface of the lens actuator to elastically support the bobbin; and a cover arranged on an upper surface of the upper spring plate and including an upper plate portion formed with an upper hole, and an upper pillar portion perpendicularly formed on a corner of the upper plate portion to be coupled to the lower pillar portion, wherein the yoke pinched by the base and the cover to expose an external wall between the mutually-coupled lower pillar portion of the base and the upper pillar portion of the cover.

Preferably, the camera module is further comprising a shield can of an enclosure centrally formed thereon with a hole and a bottom-opened inner space, accommodating the cover, the upper/lower spring plates, and the lens actuator at the inner space, and secured at a bottom end to an upper surface of the PCB.

Preferably, the lower spring plate is formed with a metal conductor to be electrically connected to a circuit of the PCB.

Preferably, the lower spring plate is electrically divided to a pair, each pair being connected to a power line of a different polarity.

Preferably, the each pair of the lower spring plate is opposite to the other pair.

Preferably, each pair of the lower spring plate is formed with a yoke terminal protruded toward the PCB to provide a power to the lens actuator.

Preferably, the camera module is further comprising an insulated spacer between the lower spring plate and a yoke of the lens actuator.

Preferably, a lower end portion of the shield can is fixedly bonded to an upper surface of the PCB by an adhesive.

In another general aspect of the present invention, there is provide a camera module, the camera module comprising: a PCB; an image sensor mounted on the PCB; a base mounted on the PCB and including a lower plate portion with an opening centrally mounted with an IR (infrared) filter, and a lower pillar portion erected at a corner portion of the lower plate portion; a lower spring plate arranged at an upper surface of the lower plate portion of the base and formed with an elastic support portion; a lens actuator including a bobbin elastically supported by the elastic support portion of the lower spring plate, accommodated inside with a lens assembly and wound with a coil, and a yoke mounted with a magnet at a position opposite to the bobbin and arranged opposite to the bobbin wound with the coil; an upper spring plate coupled to an upper surface of the lens actuator to elastically support the bobbin; a cover arranged on an upper surface of the upper spring plate and including an upper plate portion formed with an upper hole, and an upper pillar portion perpendicularly formed on a corner of the upper plate portion to be coupled to the lower pillar portion; a metal shield can of an enclosure centrally formed thereon with a hole and a bottom-opened inner space, accommodating the cover, the upper/lower spring plates, and the lens actuator at the inner space, and secured at a bottom end to an upper surface of the PCB, wherein the base and the cover are supplementarily coupled at each corner portion, and the yoke is exposed from a space formed by the lower pillar portion of the base and the upper pillar portion of the cover.

Preferably, the lower spring plate is formed with a metal conductor to be electrically connected to a circuit of the PCB.

Preferably, the lower spring plate is electrically divided to a pair, each pair being connected to a power line of a different polarity.

Preferably, the each pair of the lower spring plate is opposite to the other pair.

Preferably, each pair of the lower spring plate is formed with a yoke terminal protruded toward the PCB to provide a power to the lens actuator.

Preferably, the camera module is further comprising an insulated spacer between the lower spring plate and a yoke of the lens actuator.

Preferably, the yoke of the lens actuator is coated with an insulating member.

Preferably, a lower end portion of the shield can is fixedly bonded to an upper surface of the PCB by an adhesive.

Preferably, each thickness at the thickest portion of the lower pillar portion and the upper pillar portion is same, where a surface contacted by the lower pillar portion and the upper pillar portion takes a shape of a step.

Advantageous Effects

A camera module according to the present invention has an advantageous effect in that a cover and a base are structurally changed to enable miniaturization and light-weightiness of the camera module.

BRIEF DESCRIPTION OF THE DRAWINGS

The teachings of the present invention can be readily understood by considering the following detailed description in conjunction with the accompanying drawings, in which.

BEST MODE

Figure 1:
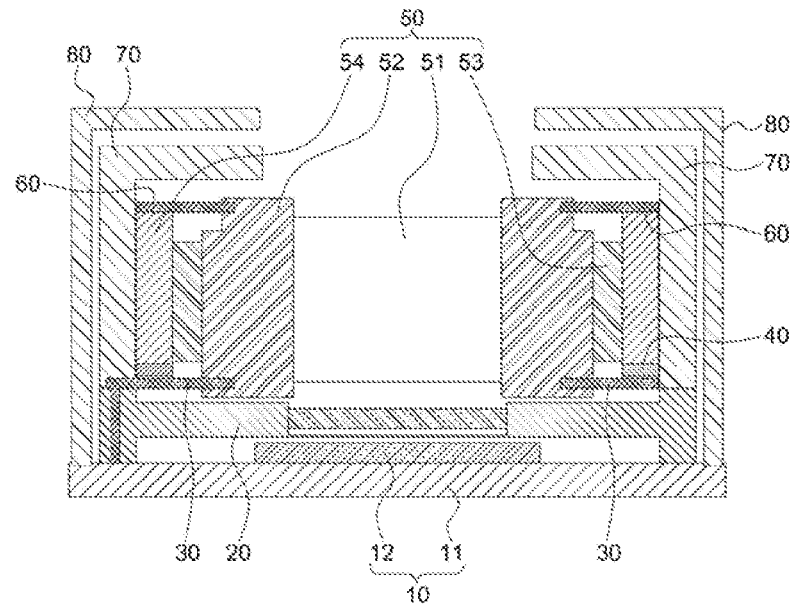
FIG. 1 is a schematic structural view of a camera module according to prior art

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

Figure 2:
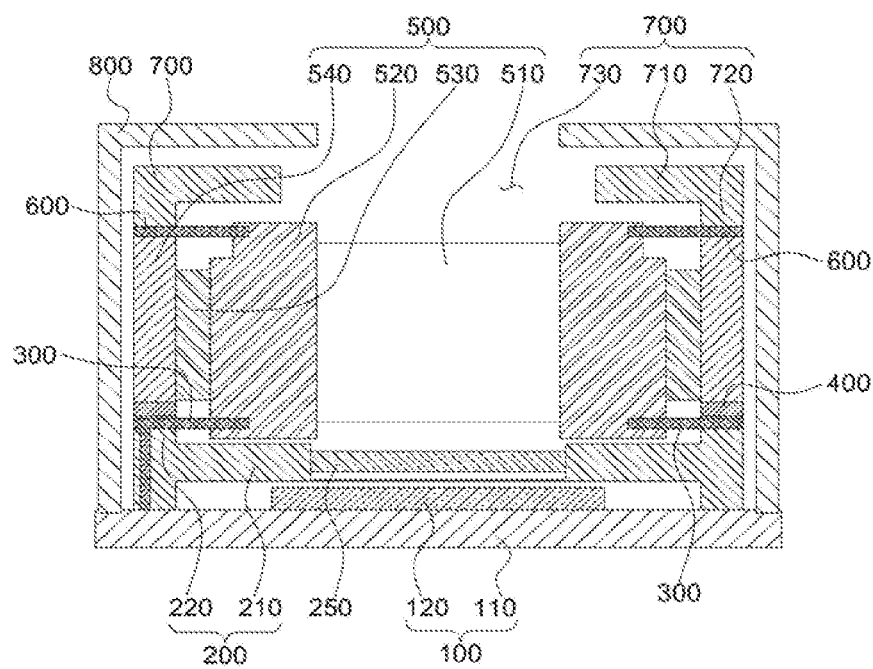
FIG. 2 is a schematic view of a camera module according to an exemplary embodiment of the present invention.

FIG. 2 is a schematic view of a camera module according to an exemplary embodiment of the present invention.

Referring to FIG. 2, a camera module according to an exemplary embodiment of the present invention includes a PCB (110), an image sensor (120), a base (200), upper and lower spring plates (300, 600), a lens assembly and a lens actuator (500), a cover (700), and a shield can (800).

The PCB (110) is mounted with the image sensor (120), and coupled by the base (200) and a lower surface of the can (800). The image sensor (120) is mounted with an image pickup device for converting light incident through a lens formed at a lens assembly (510) positioned at an upper surface of the image sensor (120) to an electrical signal.

Figure 3:
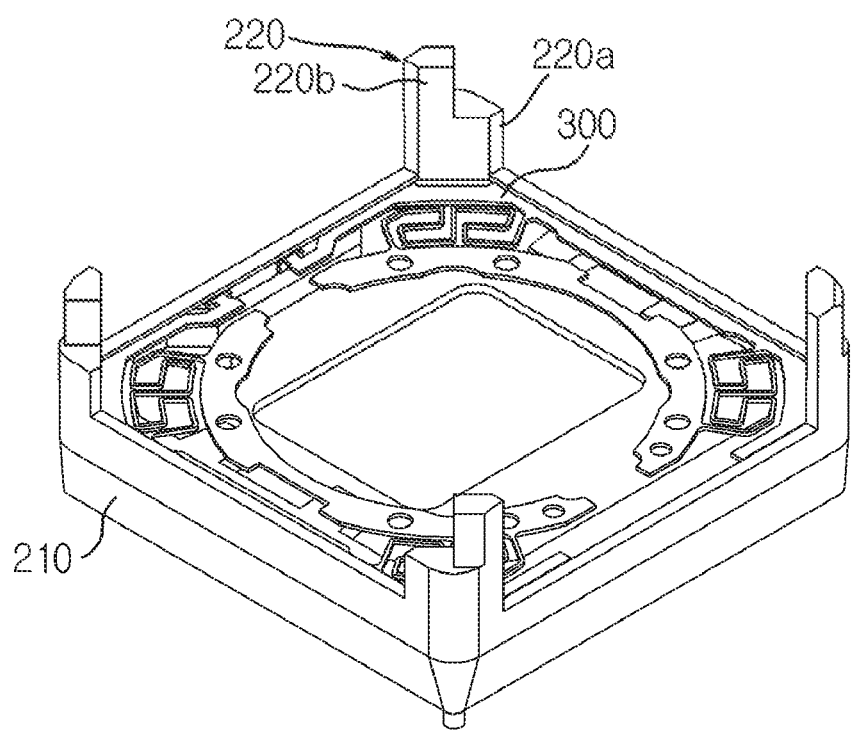
FIG. 3 is a schematic perspective view illustrating a base according to an exemplary embodiment of the present invention.
Figure 4:
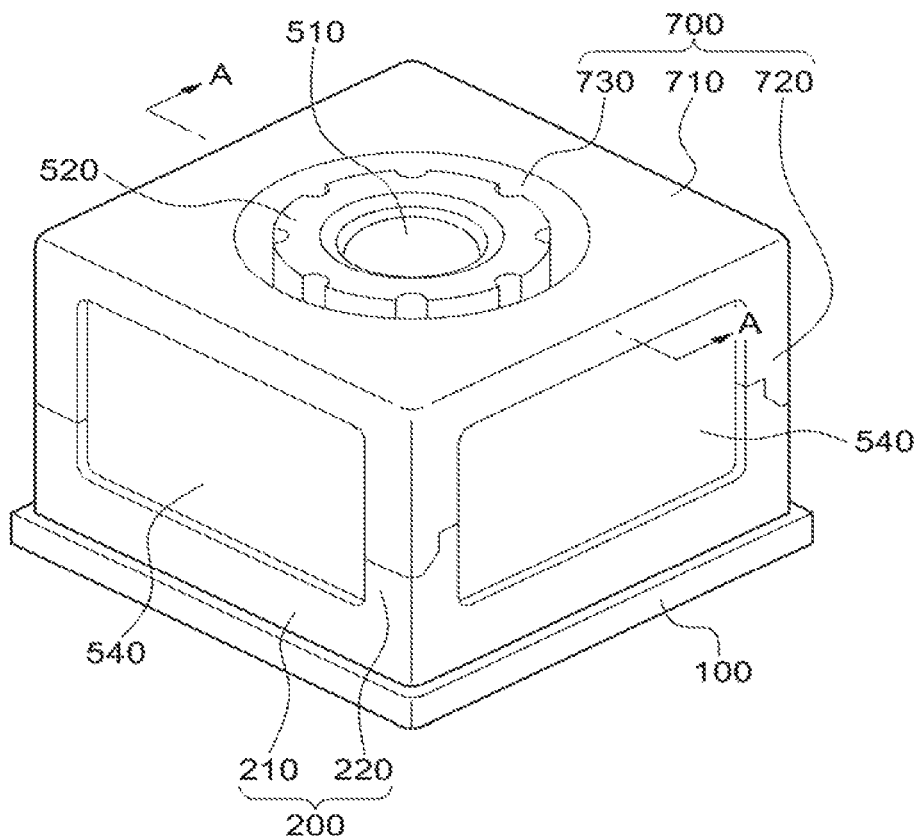
FIG. 4 is a schematic perspective view of a camera module according to an exemplary embodiment of the present invention.

The base (200) mounted on the PCB (110) is formed with a lower plate portion (210) formed with an opening mounted with an IR filter (250) filtering an infrared, and a lower pillar portion (220) perpendicularly formed at a corner portion of the lower plate portion (210). The lower pillar portion (220) is formed at a distal end thereof in a staircase having a large cross section portion (220a) and a small cross section portion (220b) integrally extended from the large cross section portion (220a). The base (200) formed with the lower plate portion and lower pillar portion (210, 220) is illustrated in FIG. 3.

The lower spring plate (300) is coupled to an upper surface of the lower plate portion (210) at the base (200) and is inwardly formed with an elastic support portion. The lower spring plate (300) and the base are mutually arranged as exemplarily illustrated in FIG. 3.

The lens actuator (500) includes a lens assembly (510), a bobbin (520) accommodating the lens assembly (510), a coil wound on a periphery of the bobbin (520) and the yoke (540), which are elements for vertically driving the lens assembly (510).

The yoke (540) is secured to the base (200), while the bobbin (520) is not secured to the yoke (540) but elastically supported by the elastic support portion of the lower spring plate (300) with a capacity of vertical movement. The upper spring plate (600) is coupled to an upper surface of the lens actuator (500) and formed with an elastic support portion elastically supporting the bobbin (520).

The cover (700) is arranged at an upper surface of the upper spring plate (600) and includes an upper plate portion (710) formed with an upper hole (730) and an upper pillar portion (720) vertically and downwardly formed at a corner of the upper plate portion (710). The upper pillar portion (720) mutually coupled to the lower pillar portion (220) of the base (200) allows the cover (700) to be coupled to the base (200).

Thus, the yoke (540) is pinched by the base (200) and the cover (700) to structurally expose an external wall between the mutually-coupled lower pillar portion (220) and the upper pillar portion (720). The coupled relationship between the upper and lower pillar portions (220, 720) and the laterally exposed structure of the yoke (540) are clearly illustrated by FIG. 4.

Although FIG. 2 has not clearly illustrated the coupled relationship between the upper and lower pillar portions (220, 720), FIG. 2 illustrates a detailed description of an inner structure of the camera module, such that the coupled relationship between the upper and lower pillar portions (220, 720) can be correspondingly described by a lateral cross-sectional view along line A-A.

In comparison between FIG. 1 of prior art and FIG. 2 according to the present invention, a center portion of a lateral wall of the cover (70) in FIG. 1 is not shown in FIG. 2, whereby there is an effect of a width of the camera module being reduced as much. Of course, as mentioned above, the coupling of the cover (700) and the base (200) is accomplished by the upper and lower pillar portions (720, 220) formed at the corner portion.

Therefore, the present invention has an effect of reducing the size of a camera module through a structural change, while maintaining the same function and structural strength as those of the VCM actuator.

MODE FOR INVENTION

Meanwhile, the shield can (800) may be coupled to an external side of the cover (700) to shield the EMI (Electromagnetic Interference). The shield can (800) is an enclosure formed at an upper center thereof with a hole and a bottom-opened inner space, accommodates the cover (700), the lower and upper spring plates (300, 600) and the lens actuator (500) at the inner space, and fixed at a bottom end to an upper surface of the PCB (110) by an adhesive. The adhesive may preferably include a conductive epoxy, but is not limited thereto.

The lower spring plate (300) is formed with a conductive metal, arranged at an upper surface of the lower plate portion (210) and electrically connected to a circuit of the PCB (110).

The lower spring plate (300) is electrically divided into a pair, each pair being connected to a power line of a different polarity. The each pair of the lower spring plate may be opposite to the other pair as shown in FIGS. 3 and 5.

Figure 5:
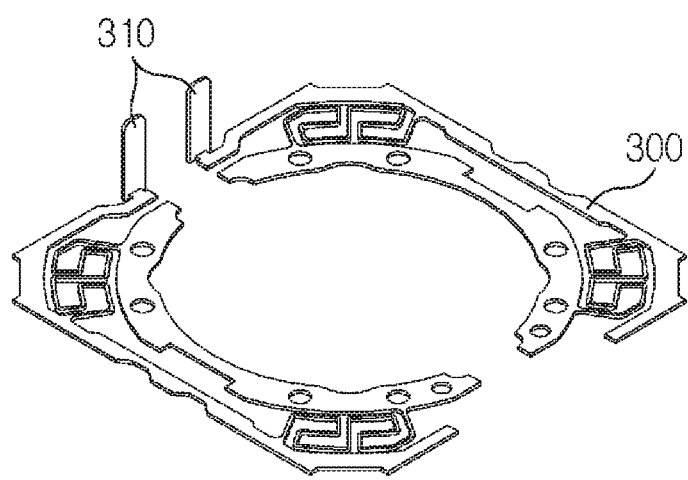
FIG. 5 is a schematic view illustrating the lower spring plate according to an exemplary embodiment of the present invention.

As illustrated in FIG. 5, each pair of the lower spring plate (300) may be formed with a yoke terminal (310) protruded toward the PCB to provide a power to the lens actuator (500). That is, the yoke terminal (310) is inserted into a connection hole of the yoke (540) at the lens actuator (500) and electrically connected to the PCB (110) through the lower spring plate (300), whereby a power can be supplied to the lens actuator (500).

An insulated spacer is formed between the lower spring plate (300) and a yoke (540) of the lens actuator (500) to further increase insulation and air-tightness.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that the novel idea of the present invention can be applied to a small-sized camera module using a voice coil motor as an automatic focus adjusting unit.

What is claimed is:

1. A camera module, the camera module comprising:
   a printed circuit board (PCB);
   an image sensor mounted on the PCB;
   a base mounted on the PCB and including a lower plate portion with an opening, and a first pillar portion formed on a corner of the lower plate portion;
   an infrared (IR) filter coupled to the base;
   a lens actuator including a bobbin, a coil arranged around the bobbin, and a yoke wrapping the periphery of the bobbin;
   a lens assembly coupled to the bobbin and configured to move in a vertical direction;
   a cover including an upper plate formed with a hole and a second pillar portion formed at a corner of the upper plate of the cover to be coupled to the first pillar portion of the base;
   an upper spring disposed between the cover and the lens actuator; and
   a lower spring including a first spring and a second spring separated from the first spring, wherein the lower spring is coupled to the base;
   wherein the lower spring is insulated from the yoke of the lens actuator;
   wherein the yoke is pinched by the base and the cover to expose a lateral surface thereof out of the cover between the mutually coupled first pillar portion of the base and the second pillar portion of the cover;
   wherein a portion of the first pillar portion is formed in a staircase that has a large horizontal cross section portion and a small horizontal cross section portion integrally extended from the large horizontal cross section portion; and
   wherein a portion of the second pillar portion is formed in a staircase that has a large horizontal cross section portion and a small horizontal cross section portion integrally extended from the large horizontal cross section portion.

2. The camera module of claim 1, wherein each of the first spring and the second spring includes an inner elastic unit coupled to the bobbin, an outer elastic unit coupled to the base, and a connection elastic unit connecting the inner elastic unit and the outer elastic unit.

3. The camera module of claim 2, wherein the first spring includes a first extension portion integrally formed by being bent from a portion of the outer elastic unit of the first spring, and the second spring includes a second extension portion integrally formed by being bent from a portion of the outer elastic unit of the second spring.

4. The camera module of claim 3, wherein the first extension portion is inserted into a first hole of the base and the second extension portion is inserted into a second hole of the base.

5. The camera module of claim 4, wherein the first extension portion includes a first terminal electrically connected to the PCB, and the second extension portion includes a second terminal electrically connected to the PCB.

6. The camera module of claim 3, wherein the first and second springs are formed in a mutually symmetrical structure.

7. The camera module of claim 2, wherein the connection elastic units of the first spring and the second spring are each spaced apart from an upper surface of the base and an inner surface of the upper plate of the cover at a predetermined distance in a vertical direction along or parallel to an optical axis.

8. The camera module of claim 1, wherein each of the first and the second springs is formed with a terminal protruded toward the PCB to provide a power to the coil,
   wherein the lower spring is disposed between the lower plate portion of the base and a lower portion of the yoke, and
   wherein the upper spring is disposed between an upper portion of the yoke and a lower portion of the cover.

9. The camera module of claim 1, further comprising a shield can accommodating the lens actuator at an inner space thereof, wherein a bottom portion of the shield can is coupled to an upper surface of the PCB.

10. The camera module of claim 9, wherein the bottom portion of the shield can is bonded to the upper surface of the PCB by an adhesive.

11. The camera module of claim 1, wherein each of the first and the second springs is connected to a power line of a different polarity.

12. The camera module of claim 11, wherein each of the first and the second springs is opposite to the other.

13. The camera module of claim 1, wherein a spacer is arranged under the yoke and exposed at a lateral surface of the cover between the base and the yoke.

14. A mobile phone, comprising the camera module according to claim 1.

15. A camera module, the camera module comprising:
   a printed circuit board (PCB);
   an image sensor mounted on the PCB;
   a base mounted on the PCB and including a lower plate portion with an opening, and a lower pillar portion erected at a corner portion of the lower plate portion;
   an infrared (IR) filter coupled to the base;
   a lens actuator including a bobbin, a coil disposed around the bobbin, and a yoke mounted with a magnet at a position arranged opposite to the coil;
   a lens assembly accommodated inside the bobbin and configured to move in a vertical direction;
   a lower spring having an elastic support portion and coupled to the bobbin;
   an upper spring having an elastic support portion and coupled to the bobbin and disposed between an upper portion of the yoke and a lower portion of the cover;
   a terminal electrically connecting the lower spring and the PCB, and arranged at the base; and
   a cover including an upper plate portion formed with an upper hole, and an upper pillar portion perpendicularly formed on a corner of the upper plate portion to be coupled to the lower pillar portion of the base;
   wherein the base and the cover are coupled at the corner portion, and the yoke is exposed from a space formed by the lower pillar portion of the base and the upper pillar portion of the cover;
   wherein the lower spring is divided into a pair and formed with a metal conductor to be electrically connected to a circuit of the PCB, and the lower spring is arranged between the lower plate portion of the base and a lower portion of the yoke, and the lower spring is insulated from the yoke of the lens actuator;
   wherein a portion of the upper pillar portion is formed in a staircase that has a large horizontal cross section portion and a small horizontal cross section portion integrally extended from the large horizontal cross section portion; and wherein a portion of the lower pillar portion is formed in a staircase that has a large horizontal cross section portion and a small horizontal cross section portion integrally extended from the large horizontal cross section portion.

16. The camera module of claim 15, wherein the lower spring includes a first spring and a second spring separated from the first spring, and wherein each of the first spring and the second spring includes an inner elastic unit coupled to the bobbin, an outer elastic unit coupled to the base, and a connection elastic unit connecting the inner elastic unit and the outer elastic unit.

17. The camera module of claim 16, wherein the lower spring is disposed on the base; and wherein the connection elastic unit of the first spring and the connection elastic unit of the second spring are each spaced apart from the upper surface of the base at a predetermined distance in a vertical direction along or parallel to an optical axis.

18. The camera module of claim 15, wherein the lower spring is formed of a metal, and wherein the terminal is integrally formed with the lower spring.

19. The camera module of claim 15, wherein the base is formed with a square-shaped opening at a center thereof, and wherein a filter is disposed over the image sensor.

20. A mobile phone, comprising the camera module according to claim 15.

* * * * *